US010552096B2

(12) United States Patent
Matsuda

(10) Patent No.: US 10,552,096 B2
(45) Date of Patent: Feb. 4, 2020

(54) COMMUNICATION APPARATUS

(71) Applicant: Brother Kogyo Kabushiki Kaisha, Nagoya-shi, Aichi-ken (JP)

(72) Inventor: Munehisa Matsuda, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 16/292,501

(22) Filed: Mar. 5, 2019

(65) Prior Publication Data
US 2019/0196752 A1 Jun. 27, 2019

Related U.S. Application Data

(63) Continuation of application No. 15/716,629, filed on Sep. 27, 2017, now Pat. No. 10,261,727.

(30) Foreign Application Priority Data

Dec. 8, 2016 (JP) .................. 2016-238813

(51) Int. Cl.
G06K 15/00 (2006.01)
G06F 3/12 (2006.01)
(Continued)

(52) U.S. Cl.
CPC .......... *G06F 3/1204* (2013.01); *G06F 3/1213* (2013.01); *G06F 3/1238* (2013.01);
(Continued)

(58) Field of Classification Search
CPC .... G06F 3/1204; G06F 3/1222; G06F 3/1238; G06F 3/1268; G06F 3/1267;
(Continued)

(56) References Cited

U.S. PATENT DOCUMENTS

2014/0070002 A1‡ 3/2014 Pineau ................. G06K 5/00 235/382
2014/0320921 A1‡ 10/2014 Oshima ............... G06F 3/1204 358/1.15
(Continued)

FOREIGN PATENT DOCUMENTS

JP 2015-011532 A ‡ 1/2015 .......... G06F 3/1203
JP 2015-011532 A 1/2015
(Continued)

Primary Examiner — Moustapha Diaby
(74) Attorney, Agent, or Firm — Banner & Witcoff, Ltd.

(57) ABSTRACT

A first communication apparatus including a control device configured to: receive a specific signal from a second communication apparatus; determine whether an inter-device distance between the communication apparatuses is equal to or smaller than a first distance; cause a server to supply printing data to a printer when the inter-device distance is equal to or smaller than the first distance; again receive the specific signal from the second communication apparatus; determine whether the inter-device distance is equal to or smaller than a second distance that is smaller than the first distance by using a second reception radio wave intensity of the again-received specific signal; and cause the printing execution unit to execute printing in accordance with the printing data when it is determined that the inter-device distance is equal to or smaller than the second distance.

17 Claims, 12 Drawing Sheets

(51) Int. Cl.
   *H04N 1/00* (2006.01)
   *H04B 17/318* (2015.01)
   *H04W 4/80* (2018.01)

(52) U.S. Cl.
   CPC ......... *G06F 3/1258* (2013.01); *G06F 3/1267* (2013.01); *G06F 3/1268* (2013.01); *G06F 3/1288* (2013.01); *G06F 3/1292* (2013.01); *H04B 17/318* (2015.01); *H04N 1/00* (2013.01); *G06F 3/1222* (2013.01); *G06F 3/1278* (2013.01); *H04W 4/80* (2018.02)

(58) Field of Classification Search
   CPC .... G06F 3/1278; G06F 3/1288; G06F 3/1292; G06F 3/1213; H04W 4/80; H04W 4/02; H04B 17/318
   See application file for complete search history.

(56) References Cited

U.S. PATENT DOCUMENTS

| | | | |
|---|---|---|---|
| 2015/0002884 A1‡ | 1/2015 | Okumura | G06F 3/1203 358/1 |
| 2015/0153981 A1‡ | 6/2015 | Iwasaki | G06F 3/1238 358/1.14 |
| 2015/0378296 A1‡ | 12/2015 | Kim | G03G 15/5091 399/80 |
| 2016/0239244 A1* | 8/2016 | Kanakubo | G06F 3/1222 |

FOREIGN PATENT DOCUMENTS

| | | | | |
|---|---|---|---|---|
| JP | 2016-151950 A | ‡ | 8/2016 | ........... G06F 3/1222 |
| JP | 2016-151950 A | | 8/2016 | |

\* cited by examiner
‡ imported from a related application (FIRST TO THIRD ILLUSTRATIVE EMBODIMENTS)
SUBMIT PROCESS (FIRST TO THIRD ILLUSTRATIVE EMBODIMENTS)

(FIRST ILLUSTRATIVE EMBODIMENT)
PRINTING PROCESS (SECOND ILLUSTRATIVE EMBODIMENT)
PRINTING PROCESS (THIRD ILLUSTRATIVE EMBODIMENT)
PRINTING PROCESS (FOURTH ILLUSTRATIVE EMBODIMENT)

(FIFTH AND SIXTH ILLUSTRATIVE EMBODIMENTS)
SUBMIT PROCESS (FIFTH AND SIXTH ILLUSTRATIVE EMBODIMENTS)

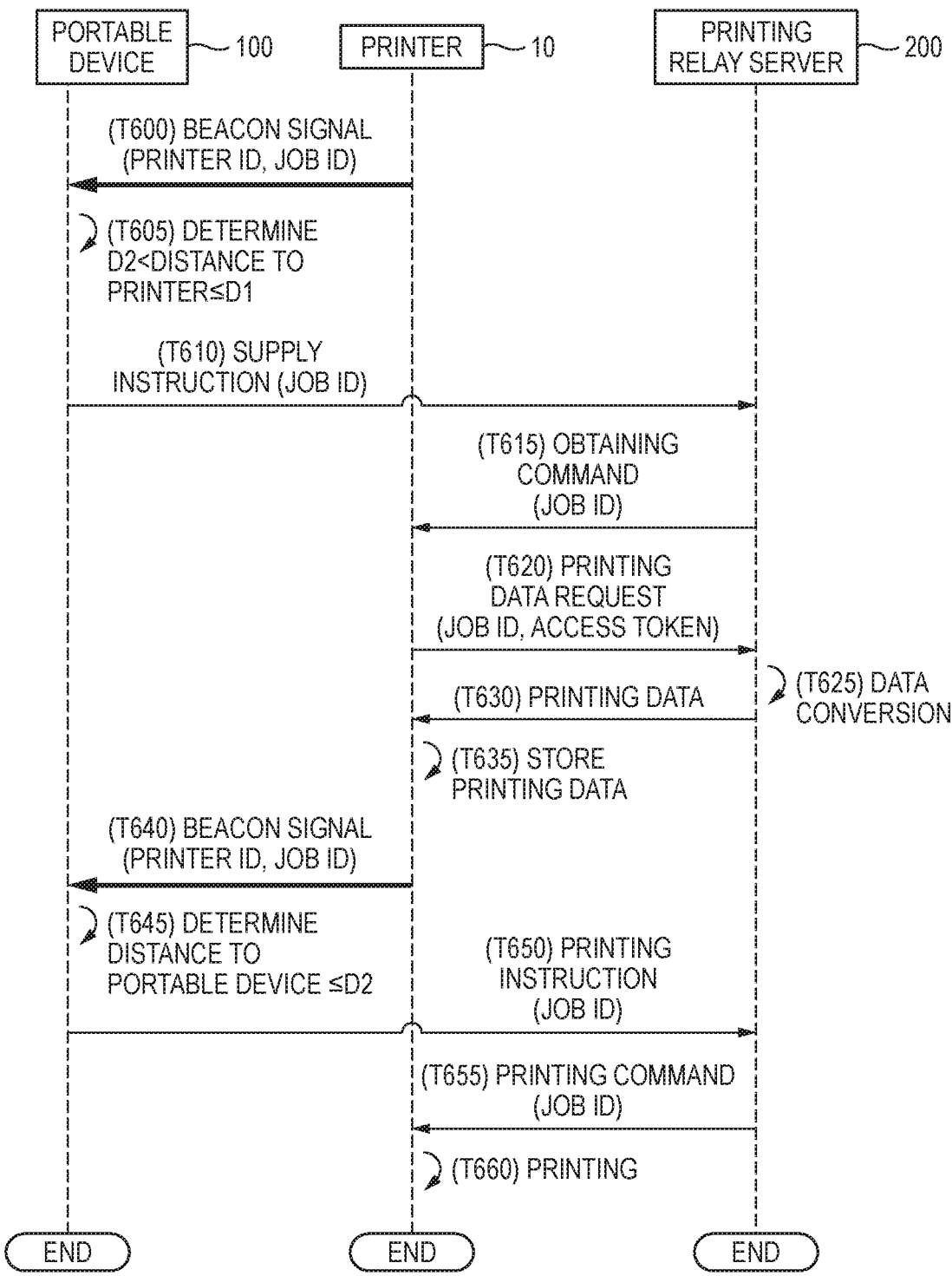

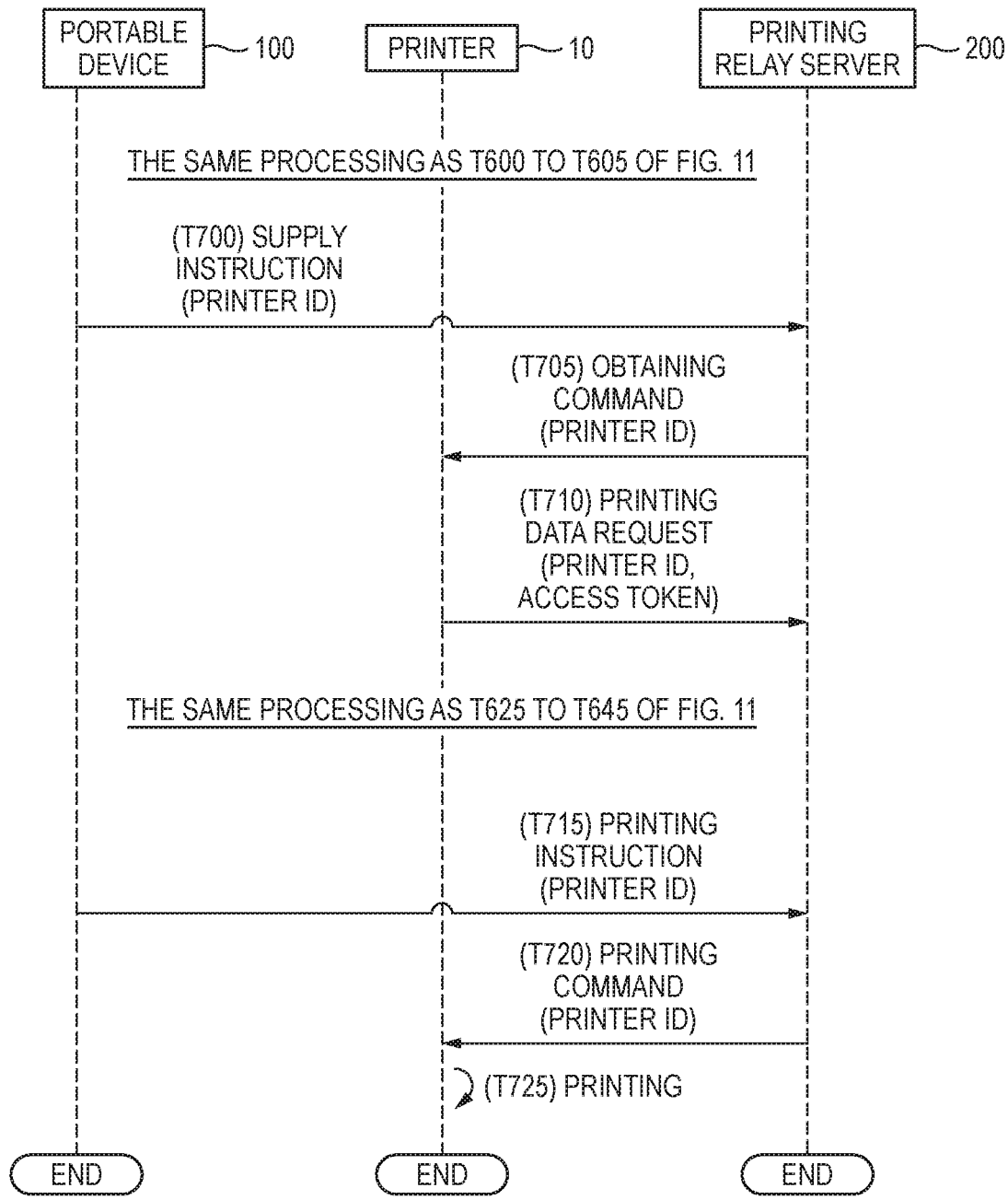

COMMUNICATION APPARATUS

CROSS-REFERENCE TO RELATED APPLICATION

This application is a continuation of prior U.S. application Ser. No. 15/716,629, filed Sep. 27, 2017, which application claims priority from Japanese Patent Application No. 2016-238813 filed on Dec. 8, 2016, the entire subject-matter of which is incorporated herein by reference.

TECHNICAL FIELD

The disclosure relates to a technology of enabling a printer to execute a printing operation by using a server.

BACKGROUND

There has been disclosed a printing system including a host computer, a mobile terminal, a printing apparatus and a server PC. The server PC is configured to receive and store identification information of the printing apparatus and a printing file, which is a printing target, from the host computer. The mobile terminal is configured to receive and store the identification information of the printing apparatus from the server PC. The mobile terminal is configured to receive, from the printing apparatus, an advertise packet including identification information, which coincides with identification information stored in advance, in accordance with BLE (abbreviation of Bluetooth (registered trademark) Low Energy). The mobile terminal is configured to obtain a distance between the mobile terminal and the printing apparatus, based on an output radio wave intensity value included in the advertise packet. When the obtained distance is smaller than a predetermined distance, the mobile terminal transmits a printing instruction to the server PC. In this case, the printing apparatus is configured to receive printing data from the server PC and to execute a printing operation in accordance with the printing data.

For example, it is assumed that the predetermined distance is set as a relatively large value (for example, 10 m). In this case, the printing apparatus executes the printing even under a situation where a user of the mobile terminal is distant from the printing apparatus, i.e., the user cannot rapidly collect a printed material from the printing apparatus. Thereby, a situation where a third person, not the user, sees or takes away the printed material for the user may occur. Also, for example, it is assumed that the predetermined distance is set as a relatively small value (for example, 1 m). In this case, the printing apparatus starts to receive a printing file from the server PC in a situation where the user of the mobile terminal is close to the printing apparatus. As a result, it takes much time for the user to receive the printed material in the vicinity of the printing apparatus. The specification discloses a technology capable of rapidly providing an adequate user with a printed material.

SUMMARY

One illustrative aspect provides a first communication apparatus comprising: a first interface; a second interface that is different from the first interface; and a control device configured to: receive a specific signal from a second communication apparatus via the first interface; determine whether an inter-device distance between the first communication apparatus and the second communication apparatus is equal to or smaller than a first predetermined distance by using a first reception radio wave intensity of the received specific signal; perform a supply control of causing a server to supply printing data to a printer having a printing execution unit by performing communication with the server via the second interface when it is determined that the inter-device distance is equal to or smaller than the first predetermined distance; again receive the specific signal from the second communication apparatus via the first interface after the printing data is supplied to the printer; determine whether the inter-device distance is equal to or smaller than a second predetermined distance by using a second reception radio wave intensity of the again-received specific signal, the second predetermined distance being smaller than the first predetermined distance; and perform a printing control of causing the printing execution unit to execute printing in accordance with the printing data, which has been obtained from the server by the printer, when it is determined that the inter-device distance is equal to or smaller than the second predetermined distance.

According to the above configuration, when the inter-device distance is equal to or smaller than the first predetermined distance, the first communication apparatus supplies the printing data from the server to the printer having the printing execution unit. Thereafter, when the inter-device distance is equal to or smaller than the second predetermined distance, which is smaller than the first predetermined distance, the first communication apparatus enables the printing execution unit to execute the printing in accordance with the printing data. In this way, in a situation where the inter-device distance is equal to or smaller than the first predetermined distance, since the printer obtains the printing data from the server but the printing is not executed yet, it is possible to suppress a situation where a third person sees or takes away the printed material. Thereafter, in a situation where the inter-device distance is equal to or smaller than the second predetermined distance, since the printer has already obtained the printing data, the printing can be rapidly executed. Thereby, it is possible to rapidly provide an adequate user with the printed material.

A control method, a computer program and a non-transitory computer-readable medium having the computer program stored thereon for implementing the first communication apparatus are also novel and useful. Also, a communication system including the first communication apparatus and the other apparatuses (for example, the second communication apparatus and/or the server) are also novel and useful.

BRIEF DESCRIPTION OF DRAWINGS

FIG. 11 depicts a sequence diagram of a printing process in the fifth illustrative embodiment; and FIG. 12 depicts a sequence diagram of a printing process in the fifth illustrative embodiment.

DETAILED DESCRIPTION

First Illustrative Embodiment (Configuration of Communication System 2)

Figure 1:
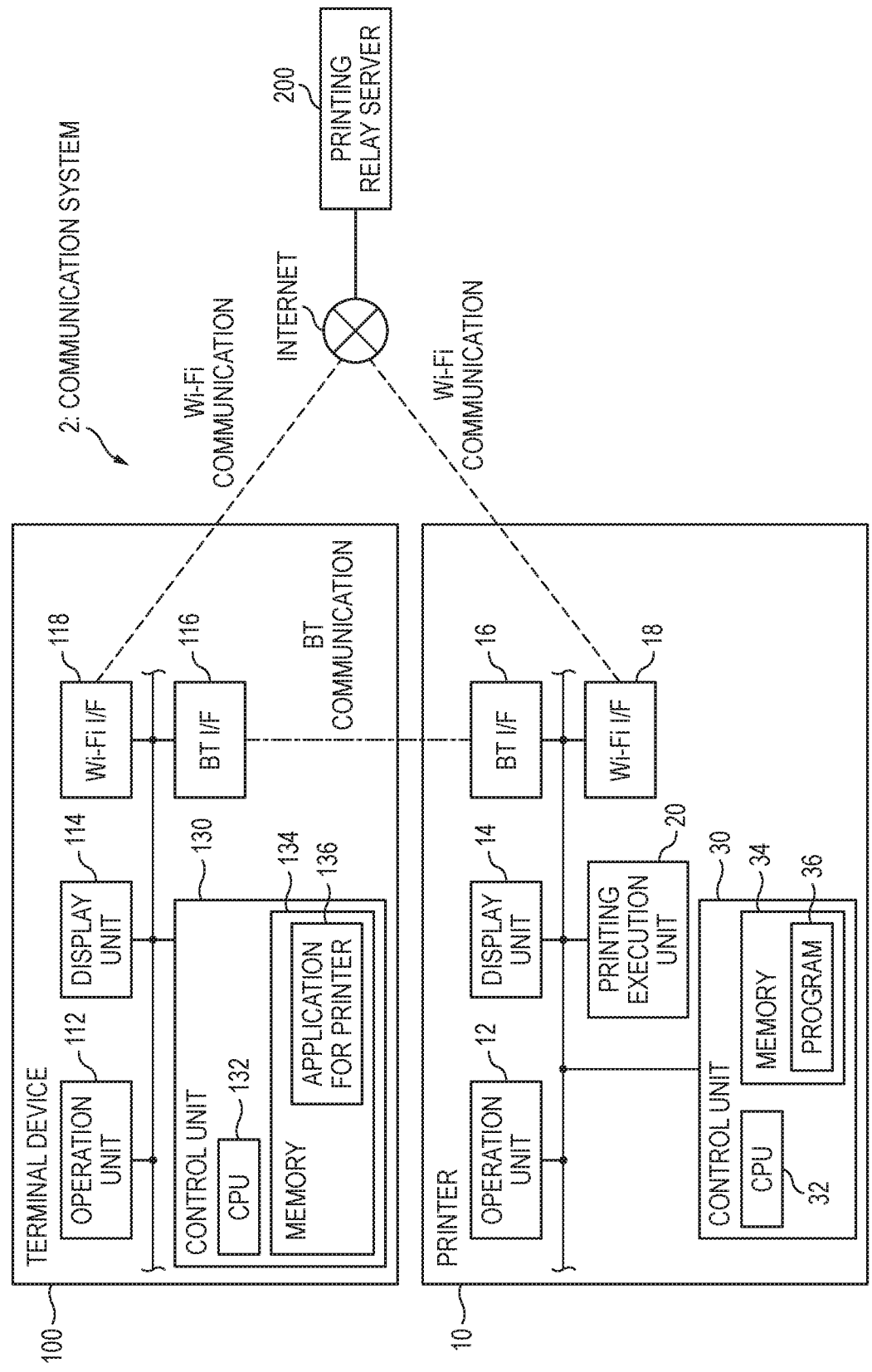
FIG. 1 depicts a configuration of a communication system.

As shown in FIG. 1, a communication system 2 includes a printer 10, a portable device 100 and a printing relay server 200. The respective devices 10, 100 can perform communication with the printing relay server 200 through the Internet by using wireless communication in accordance with a Wi-Fi method (hereinafter, referred to as 'Wi-Fi communication'). In modified embodiments, the respective devices 10, 100 may be configured to perform communication with the printing relay server 200 by using wireless communication in accordance with 3G, 4G or the like, or may be configured to perform communication with the printing relay server 200 by using wired communication. Also, the respective devices 10, 100 can perform wireless communication in accordance with a Bluetooth method (hereinafter, referred to as 'BT communication').

(Configuration of Printer 10)

The printer 10 is a peripheral device (i.e., a peripheral device such as a PC) capable of executing a printing function. The printer 10 includes an operation unit 12, a display unit 14, a BT (abbreviation of Bluetooth) interface 16, a Wi-Fi interface 18, a printing execution unit 20 and a control unit 30. The respective units 12 to 30 are connected to a bus line (a reference numeral thereof is omitted). Hereinafter, the interface is referred to as "I/F".

The operation unit 12 includes a plurality of keys. A user can input a variety of instructions to the printer 10 by operating the operation unit 12. The display unit 14 is a display for displaying a variety of information. The printing execution unit 20 is a printing mechanism of an inkjet, laser method or the like.

The BT I/F 16 is an I/F for performing BT communication. The Bluetooth method is a wireless communication method based on standards of IEEE (abbreviation of The Institute of Electrical and Electronics Engineers, Inc.) 802.15.1 and standards based thereon, for example. More specifically, the BT I/F 16 supports BLE (abbreviation of Bluetooth Low Energy).

The Wi-Fi I/F 18 is an I/F for performing Wi-Fi communication. The Wi-Fi method is a wireless communication method based on standards of IEEE 802.11 and standards based thereon (for example, 802.11a, 11b, 11g, 11n and the like), for example.

The differences between the Wi-Fi method and the BT method are described. A communication rate of Wi-Fi communication (for example, the maximum communication rate is 600 Mbps) is higher than communication rate of BT communication (for example, the maximum communication rate is 24 Mbps). In Wi-Fi communication, a frequency of a carrier wave is within 2.4 GHz band or 5.0 GHz band. In BT communication, a frequency of the carrier wave is within 2.4 GHz band. That is, when 5.0 GHz band is adopted as the frequency of the carrier wave in Wi-Fi communication, the frequency of the carrier wave in Wi-Fi communication and the frequency of the carrier wave in BT communication are different. Also, a maximum distance in which it is possible to perform Wi-Fi communication (for example, about 100 m) is greater than a maximum distance in which it is possible to perform BT communication (for example, about several tens of meters).

The control unit 30 includes a CPU 32 and a memory 34. The CPU 32 is configured to execute a variety of processing in accordance with a program 36 stored in the memory 34. The memory 34 consists of a volatile memory, a non-volatile memory and the like.

(Configuration of Portable Device 100)

The portable device 100 is a portable device such as a mobile phone (for example, a smart phone), a PDA, a notebook, a tablet PC, a portable music playback device, a portable moving picture playback device and the like. The portable device 100 includes an operation unit 112, a display unit 114, a BT I/F 116, a Wi-Fi I/F 118 and a control unit 130. The respective units 112 to 130 are connected to a bus line (a reference numeral thereof is omitted).

The operation unit 112 includes a plurality of keys. The user can input a variety of instructions to the portable device 100 by operating the operation unit 112. The display unit 114 is a display for displaying a variety of information. The display unit 114 is configured to function as a so-called touch panel, too (i.e., as an operation unit, too). The BT I/F 116 and the Wi-Fi I/F 118 are the same as the BT I/F 16 and the Wi-Fi I/F 18 of the printer 10.

The control unit 130 includes a CPU 132 and a memory 134. The CPU 132 is configured to execute a variety of processing, in response to an OS program (not shown) stored in the memory 134.

The memory 134 consists of a volatile memory, a non-volatile memory and the like. In the memory 134, not only the OS program for implementing basic operations of the portable device 100 but also an application 136 for a printer (hereinafter, simply referred to as "application 136") is stored. The application 136 is an application for enabling the printer 10 to execute the printing by using the printing relay server 200. The application 136 may be installed in the portable device 100 from a server on the Internet, which is provided by a vendor of the printer 10, or may be installed in the portable device 100 from a medium provided together with the printer 10, for example.

(Configuration of Printing Relay Server 200)

The printing relay server 200 is a server on the Internet, and is a GCP (abbreviation of Google Cloud Print) server provided by Google (registered trademark), for example. However, in modified embodiments, the printing relay server 200 may be a server that is provided by the vendor of the printer 10, for example.

The printing relay server 200 is a server for executing relay of printing between a printer (for example, the printer 10) and an external device (for example, the portable device 100). That is, the printing relay server 200 is configured to convert an image file, which is to be submitted from the external device, into printing data having a data format, which can be interpreted by the printer, and to supply the printing data to the printer. Therefore, even though the external device does not have a printing driver for converting the image file into the printing data, when the external device submits an image file to the printing relay server 200, it is possible to enable the printer to execute the printing.

(Advance Preparation)

The user of the portable device 100 executes a following advance preparation so as to enable the printer 10 to execute the printing by using the printing relay server 200. Here, it is assumed that the portable device 100 and the printer 10 belong to the same wireless LAN (abbreviation of Local Area Network). That is, the portable device 100 and the printer 10 can perform Wi-Fi communication with each other via an access point.

First, the user registers account information on the printing relay server 200 by using the portable device 100. The account information is information for identifying the user, and includes a user ID, a password and the like, for example.

Then, the user transmits the account information to the printing relay server 200 with the portable device 100 and logs in the printing relay server 200. Then, the user searches the printer 10 in the wireless LAN with the portable device 100, and selects the printer 10 as a printer that should be registered on the printing relay server 200. As a result, a registration instruction is transmitted from the portable device 100 to the printer 10.

When the printer 10 receives the registration instruction from the portable device 100, the printer 10 transmits a printer registration request including a printer name of the printer 10 to the printing relay server 200. The printer name is information (for example, a model name of the printer 10) for identifying the printer 10. Thereby, the printing relay server 200 generates a printer ID and a registration token and associates the printer name, the printer ID and the registration token. When the printer 10 receives the printer ID and the registration token from the printing relay server 200, the printer transmits the registration token to the portable device 100.

When the portable device 100 receives the registration token from the printer 10, the portable device transmits the registration token to the printing relay server 200. Thereby, the printing relay server 200 associates and registers the account information logged-in already and the printer name and printer ID corresponding to the registration token.

Then, the printer 10 transmits an access request including the printer ID to the printing relay server 200. Thereby, the printing relay server 200 generates an access token, and associates and registers the account information, the access token, the printer name and the printer ID (refer to an initial state of the printing relay server 200 in FIG. 2). When the printer 10 receives the access token from the printing relay server 200, the printer stores therein the access token and the printer ID (refer to an initial state of the printer 10 in FIG. 2). When the respective communications are performed, XMPP connection (abbreviation of eXtensible Messaging and Presence Protocol), which is so-called always-on connection, is established between the printer 10 and the printing relay server 200. When the advance preparation is completed, each processing of FIG. 2 and thereafter is executed.

Figure 2:
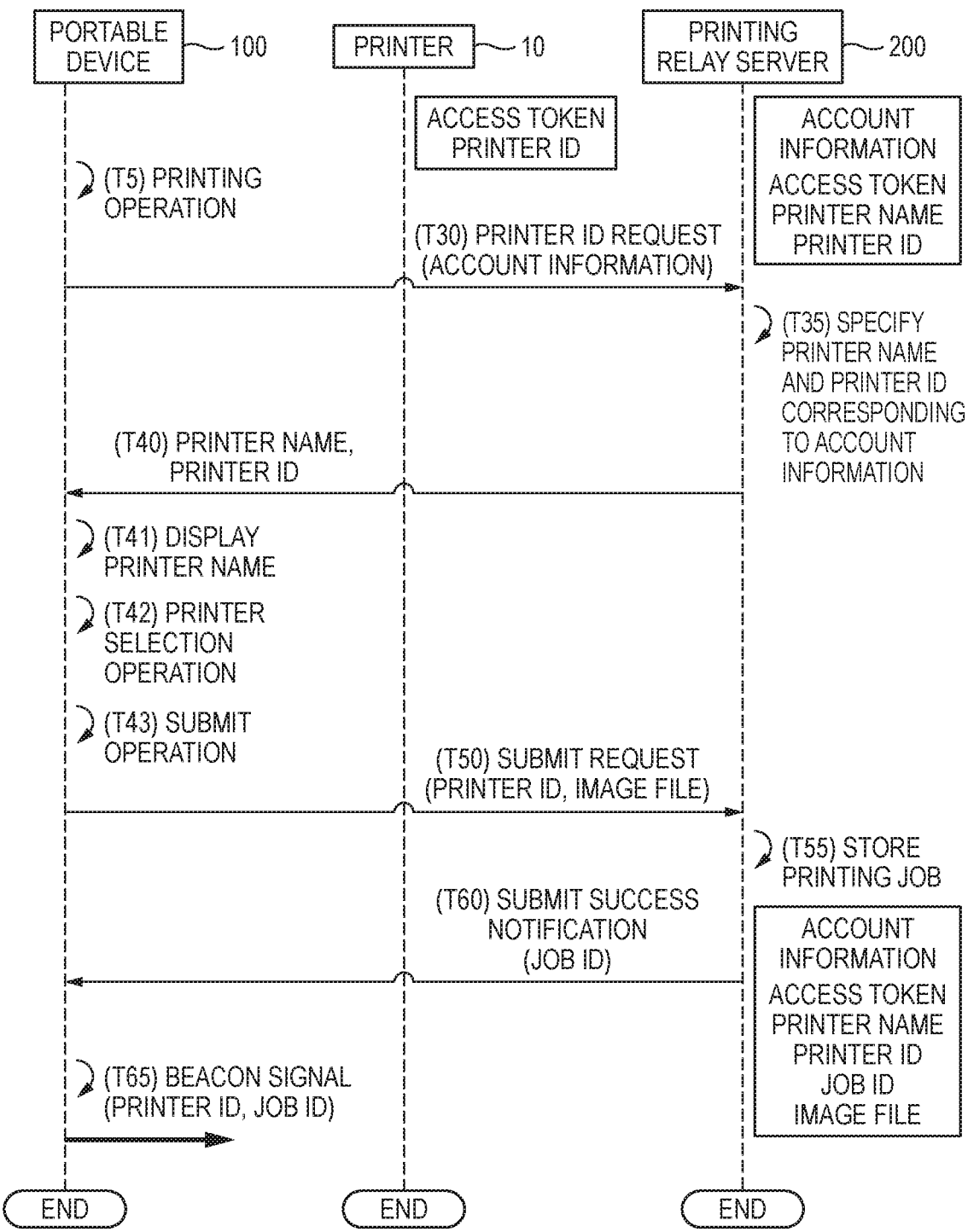
FIG. 2 depicts a sequence diagram of a submit process in first to third illustrative embodiments.

(Submit Process; FIG. 2)

A submit process in which the portable device 100 submits an image file to the printing relay server 200 is described with reference to FIG. 2. The CPU 132 of the portable device 100 executes a submit process in accordance with the application 136. In FIG. 2, the BT communication that is performed between the printer 10 and the portable device 100 is denoted with thick line arrows, and the other communications are denoted with thin line arrows. This is also the same in FIGS. 2, 5 and the like.

In T5, the user of the portable device 100 executes a printing operation for enabling the printer to execute the printing with the portable device 100. In T30, the CPU 132 transmits a printer-related information request including the account information to the printing relay server 200 via the Wi-Fi I/F 118. The printer-related information request is a command for requesting the printing relay server 200 to transmit the printer name and printer ID associated with the account information.

When the printing relay server 200 receives the printer-related information request from the portable device 100, the printing relay server specifies a printer name and a printer ID associated with the account information in the printer-related information request, in T35, and transmits the specified printer name and printer ID to the portable device 100, in T40. Meanwhile, in FIG. 2, only one printer name and one printer ID are associated with the account information. However, when the user of the portable device 100 has already executed the advance preparation for a plurality of printers including the printer 10, a situation where the account information is associated with the plurality of printer names and printer IDs is considered. In this case, the printing relay server 200 specifies the plurality of printer names and printer IDs in T35 and transmits the plurality of specified printer names and printer IDs to the portable device 100, in T40.

When the printer name and the printer ID are received from the printing relay server 200 via the Wi-Fi I/F 118, the CPU 132 displays the printer name on the display unit 114, in T41. In T42, the user of the portable device 100 executes a printer selection operation of selecting the printer name of the printer 10 with the portable device 100. In the above situation, in T41, the plurality of printer names is displayed, and in the printer selection operation of T42, the printer name of the printer 10 is selected from the plurality of printer names.

In T43, the user of the portable device 100 executes a submit operation for selecting an image file, which is a printing target, from a plurality of image files stored in the memory 134 with the portable device 100. In T50, the CPU 132 transmits a submit request, which includes the printer ID associated with the printer name selected in T42 and the image file selected in T43, to the printing relay server 200 via the Wi-Fi I/F 118.

When the printing relay server 200 receives the submit request from the portable device 100, the printing relay server generates a job ID for identifying a printing job and associates and stores the printer ID included in the submit request, the generated job ID and the image file included in the submit request, in T55. Then, in T60, the printing relay server 200 transmits a submit success notification including the job ID to the portable device 100.

When the submit success notification is received from the printing relay server 200 via the Wi-Fi I/F 118, the CPU 32 stores the printer ID associated with the printer name selected in T42 and the job ID included in the submit success notification in the memory 134. Then, in T65, the CPU 132 repeatedly transmits a Beacon signal including the printer ID and the job ID via the BT I/F 116.

Figure 3:
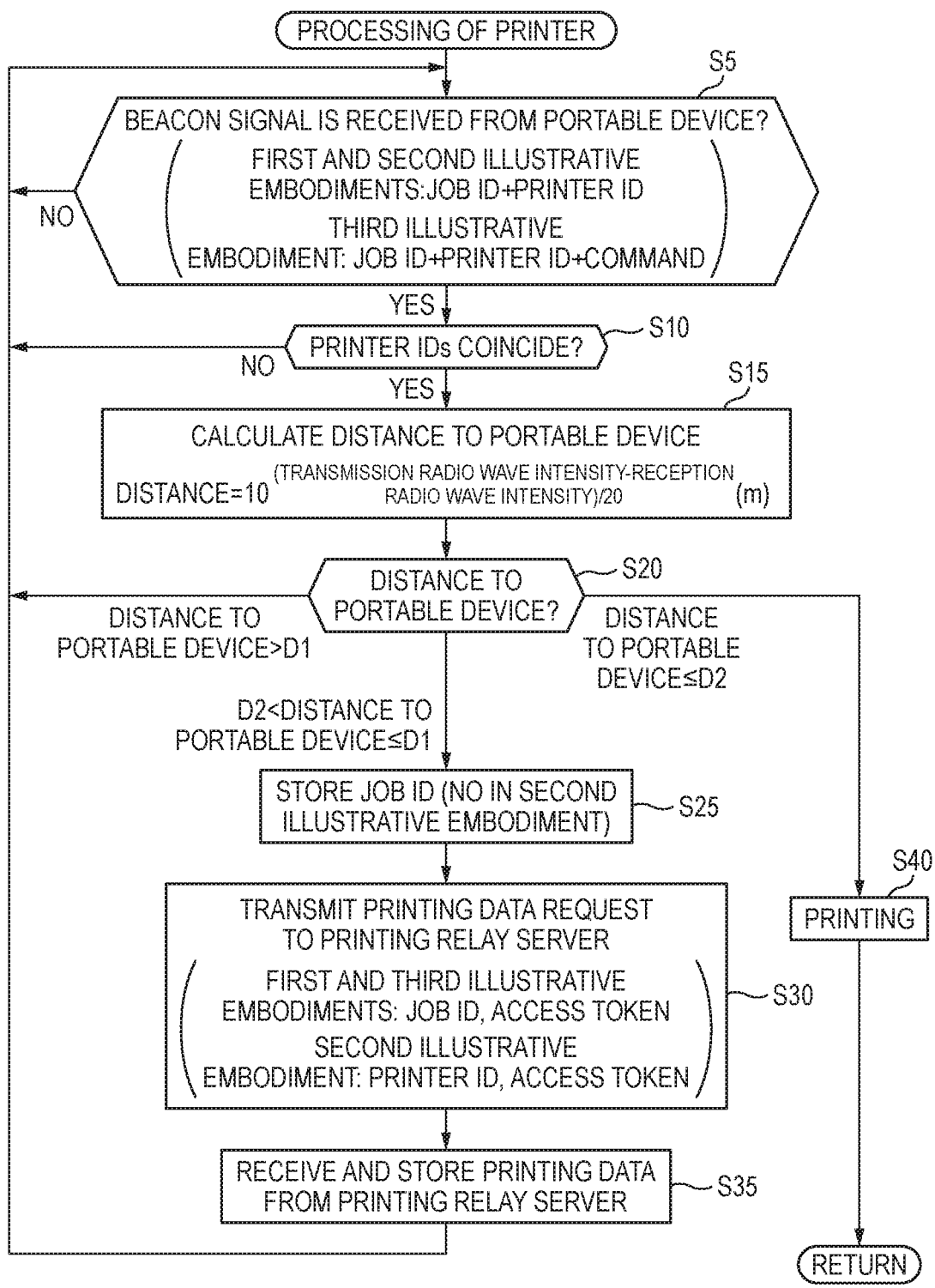
FIG. 3 is a flowchart of processing that is to be executed by a printer in the first to third illustrative embodiments.

(Processing of Printer; FIG. 3)

Subsequently, processing that is to be executed by the CPU 32 of the printer 10 in accordance with the program 36 is described with reference to FIG. 3.

In S5, the CPU 32 monitors whether the Beacon signal (refer to T65 in FIG. 2) including the printer ID and job ID is received from the portable device 100 via the BT I/F 16. When the Beacon signal is received, the CPU 32 determines YES in S5 and proceeds to S10.

In S10, the CPU 32 determines whether the printer ID in the received Beacon signal coincides with the printer ID stored in the memory 34. When it is determined that the two printer IDs coincide with each other (YES in S10), the CPU 32 proceeds to S15. On the other hand, when it is determined that the two printer IDs do not coincide with each other (NO in S10), the CPU 32 returns to S5. When a Beacon signal including a printer ID for identifying a printer different from the printer 10 is received, i.e., when a Beacon signal is received as an image file, which is to be printed by a printer different from the printer 10, is submitted to the printing relay server 200, the CPU 32 determines NO in S10. In this case, processing of S15 and thereafter is not executed, so that it is possible to reduce processing load.

In S15, the CPU 32 calculates a distance between the printer 10 and the portable device 100. Specifically, first, the CPU 32 specifies a transmission radio wave intensity described in the Beacon signal. The transmission radio wave intensity is a radio wave intensity of a carrier wave upon transmission of the Beacon signal. More specifically, the transmission radio wave intensity is the same as a reception radio wave intensity of the carrier wave, which is measured at a point distant from the portable device 100 by 1 m, which is a transmission source of the Beacon signal. A vendor of the portable device 100 measures in advance a reception radio wave intensity of a carrier wave, which is measured at a point distant from the portable device 100 by 1 m, and adjusts the portable device 100 so that the measured reception radio wave intensity is described in a Beacon signal as the transmission radio wave intensity. Then, the CPU 32 obtains a reception radio wave intensity, which is a radio wave intensity of the carrier wave upon reception of the Beacon signal, from the BT I/F 16. Then, the CPU 32 substitutes the specified transmission radio wave intensity and the obtained reception radio wave intensity in an equation indicated in S15 and thus calculates a distance between the printer 10 and the portable device 100.

In S20, the CPU 32 compares the calculated distance and two predetermined distances D1, D2. The predetermined distance D1 is set as a relatively large value (for example, 10 m) and the predetermined distance D2 is set as a relatively small value (for example, 1 m), i.e., a value smaller than the predetermined distance D1. When it is determined that the calculated distance is greater than the predetermined distance D1 ("distance to the portable device>D1, in S20), the CPU 32 returns to S5. Also, when it is determined that the calculated distance is equal to or smaller than the predetermined distance D1 and is greater than the predetermined distance D2 ("D2<distance to the portable device≤D1", in S20), the CPU 32 proceeds to S25. Also, when it is determined that the calculated distance is equal to or smaller than the predetermined distance D2 ("distance to the portable device≤D2", in S20), the CPU 32 proceeds to S40.

In S25, the CPU 32 stores, in the memory 34, the job ID in the received Beacon signal.

In S30, the CPU 32 transmits a printing data request for requesting transmission of printing data to the printing relay server 200 via the Wi-Fi I/F 18. The printing data request includes the job ID stored in S25 and the access token stored in the advance preparation.

In S35, the CPU 32 receives printing data, which is generated from the image file associated with the job ID in the printing data request, from the printing relay server 200 via the Wi-Fi I/F 18, and stores the printing data in the memory 34. In this way, the CPU 32 can appropriately receive the printing data, which is identified by the job ID, from the printing relay server 200 by transmitting the printing data request including the job ID to the printing relay server 200. When the processing of S35 is over, the CPU 32 returns to S5.

Meanwhile, in S40, the CPU 32 supplies the printing data stored in S35 to the printing execution unit 20 and enables the printing execution unit 20 to execute the printing in accordance with the printing data. When the processing of S40 is over, the CPU returns to S5.

Figure 4:
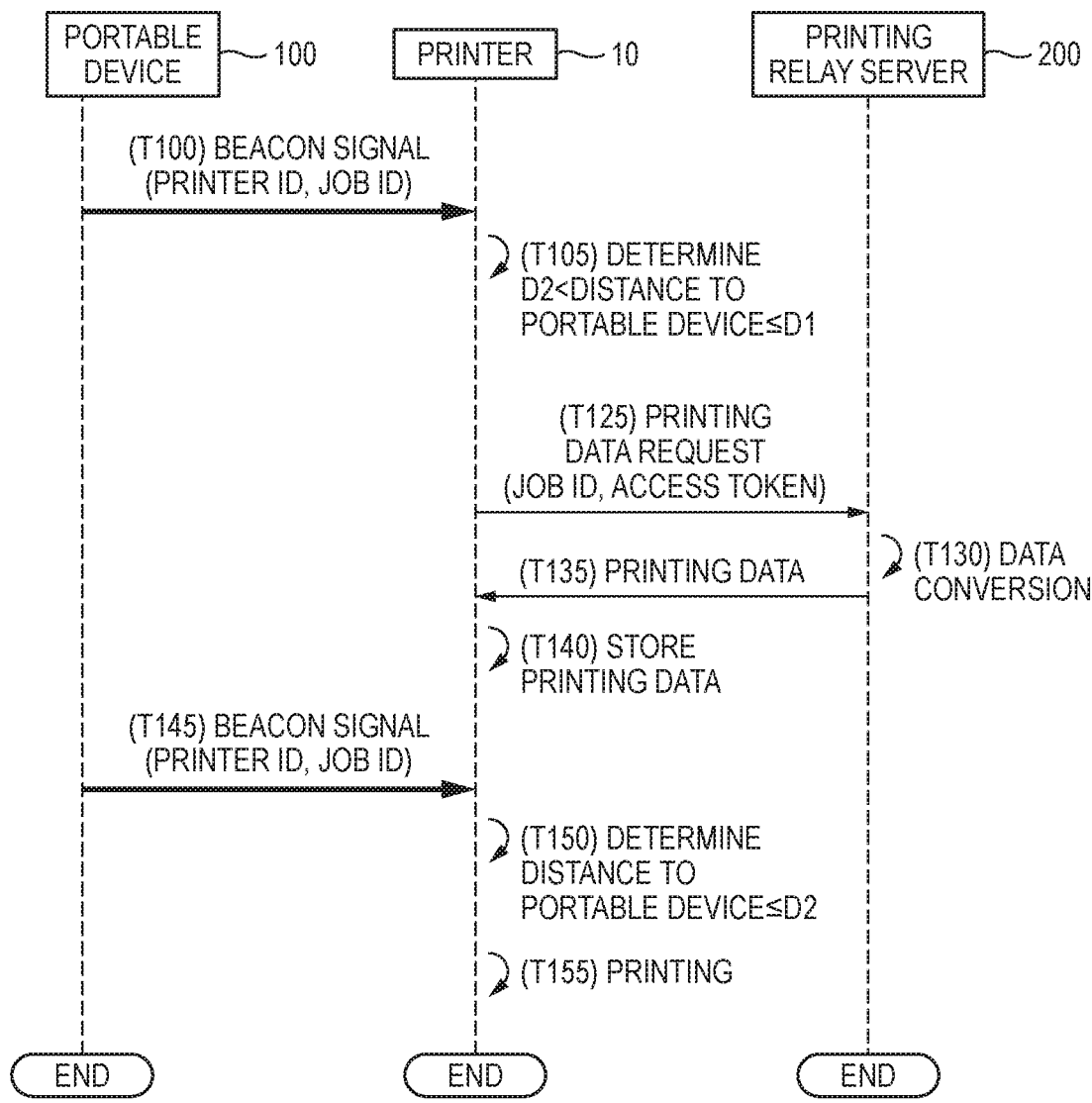
FIG. 4 depicts a sequence diagram of a printing process in the first illustrative embodiment.

(Specific Case; FIG. 4)

Subsequently, a specific case of the printing process that is to be implemented by the processing shown in FIG. 3 is described with reference to FIG. 4. After the submit process of FIG. 2 is over, the user of the portable device 100 approaches to the printer 10 with carrying the portable device 100.

In T100, the printer 10 receives the Beacon signal including the printer ID and job ID from the portable device 100 (YES in S5 of FIG. 3), and determines that the printer ID in the Beacon signal coincides with the stored printer ID (YES in S10). In T105, the printer 10 calculates a distance between the printer 10 and the portable device 100 (S15), and determines that the calculated distance is equal to or smaller than the predetermined distance D1 and is greater than the predetermined distance D2 ("D2<distance to the portable device≤D1", in S20). In this case, in T125, the printer 10 transmits the printing data request including the stored job ID and access token to the printing relay server 200.

When the printing relay server 200 receives the printing data request from the printer 10, the printing relay server 200 converts an image file associated with the job ID in the printing data request into printing data having a data format, which can be interpreted by the printer 10, in T130.

The printer 10 receives the printing data from the printing relay server 200, in T135, and stores the received printing data, in T140 (S35). Thereafter, the user of the portable device 100 further approaches to the printer 10 with carrying the portable device 100.

The processing of T145 is the same as the processing of T100. In T150, the printer 10 calculates a distance between the printer 10 and the portable device 100 (S15), and determines that the calculated distance is equal to or smaller than the predetermined distance D2 ("distance to the portable device≤D2", in S20). In this case, in T155, the printer 10 executes the printing in accordance with the printing data (S40). Although not shown, when predetermined time elapses after the Beacon signal is transmitted in T65 of FIG. 2, the portable device 100 stops the transmission of the Beacon signal. Incidentally, when it is determined that the calculated distance is equal to or smaller than the predetermined distance D1 and is greater than the predetermined distance D2 in S20, the CPU 32 may determine whether the printing data is stored in the memory 34 and may return to S5 if it is determined that the printing data has been stored in the memory 34.

Meanwhile, in T100 to T155, the XMPP connection between the printer 10 and the printing relay server 200 is not used. Therefore, even in a situation where a firewall of the wireless LAN to which the printer 10 belongs prohibits using the XMPP connection, it is possible to appropriately implement the printing process.

(Advantages of First Illustrative Embodiment)

According to the first illustrative embodiment, when it is determined that the distance between the printer 10 and the portable device 100 is equal to or smaller than the predetermined distance D1 and is greater than the predetermined distance D2 (T105), the printer 10 transmits the printing data request to the printing relay server 200 (T125) and receives and stores the printing data from the printing relay server 200 (T135, T140). Then, when it is determined that the distance between the printer 10 and the portable device 100 is equal to or smaller the predetermined distance D2 (T150), the printer 10 executes the printing in accordance with the stored printing data (T155). Thereby, in a situation where the distance between the printer 10 and the portable device 100 is equal to or smaller than the predetermined distance D1, the printer 10 obtains the printing data from the printing relay server 200 but the printing is not performed yet. Therefore, it is possible to suppress a situation where a third person sees or takes away a printed material. Also, in a situation where the distance between the printer 10 and the portable device 100 is equal to or smaller the predetermined distance D2, since the printer 10 has already obtained the printing data, it is possible to rapidly execute the printing. Thereby, it is possible to rapidly provide an adequate user with a printed material.

Incidentally, the printer 10 and the portable device 100 are examples of "the first communication apparatus" and "the second communication apparatus", respectively. The Beacon signal is an example of "the specific signal". The distance calculated in S13 of FIG. 3 is an example of "the first target value" and "the second target value". The predetermined distance D1 and the predetermined distance D2 are examples of "the first predetermined distance" and "the second predetermined distance", respectively. The printer ID and the job ID are examples of "the printer information" and "the data information", respectively. The BT I/F 16 and the Wi-Fi I/F 18 are examples of "the first interface" and "the second interface", respectively.

Second Illustrative Embodiment

Differences from the first illustrative embodiment are described. In a second illustrative embodiment, the processing of S25 in FIG. 3 is not executed. Also, in S30, the CPU 32 transmits the printing data request including the printer ID and access token stored in the advance preparation to the printing relay server 200 via the Wi-Fi I/F 18. The second illustrative embodiment is different from the first illustrative embodiment, in that the printing data request includes the printer ID, instead of the job ID.

Figure 5:
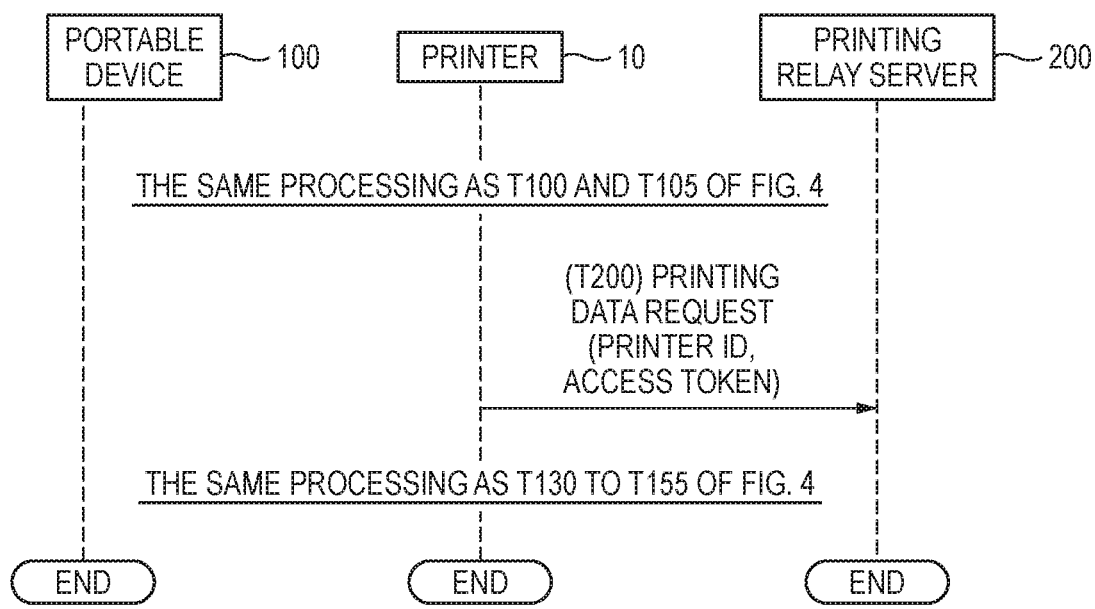
FIG. 5 depicts a sequence diagram of a printing process in the second illustrative embodiment.

(Specific Case; FIG. 5)

Subsequently, a printing process of the second illustrative embodiment is described with reference to FIG. 5. The processing of T100 and T105 is the same as the processing of T100 and T105 of FIG. 4. In T200, the printer 10 transmits a printing data request including a printer ID and an access token to the printing relay server 200 (S30 in FIG. 3). The processing of T130 to T155 is the same as the processing of T130 to T155 of FIG. 4. Meanwhile, in T130, the printing relay server 200 specifies a job ID associated with the printer ID in the printing data request and converts an image file associated with the job ID into printing data.

(Advantages of Second Illustrative Embodiment)

Also in the second illustrative embodiment, the printer 10 can rapidly provide an adequate user with a printed material. Also, the printer 10 transmits, to the printing relay server 200, the printing data request including the printer ID, instead of the job ID, (T200). For this reason, the printer 10 is not required to store therein the job ID (refer to S25 in FIG. 3), so that an amount of information to be stored in the memory 34 is reduced.

Also, a situation is considered in which the submit process of FIG. 2 is executed more than once, so that the printing relay server 200 stores therein a plurality of sets of a job ID and an image file in association with the account information, the access token and the printer ID. In this situation, in T130 of FIG. 5, the printing relay server 200 specifies a plurality of job IDs associated with the printer ID and converts a plurality of image files associated with the plurality of job IDs into a plurality of printing data. As a result, the printer 10 receives the plurality of printing data from the printing relay server 200 via the Wi-Fi I/F 18, in T135, stores the plurality of printing data in T140, and executes the printing in accordance with the plurality of printing data in T155. That is, the printer 10 can execute the printing in accordance with the plurality of printing data simply by transmitting once the printing data request including the printer ID to the printing relay server 200.

Third Illustrative Embodiment

Differences from the first illustrative embodiment are described. In a third illustrative embodiment, the program 36 of the printer 10 does not include the program for enabling the CPU 32 to execute the processing of S10 to S40 of FIG. 3. In S5 of FIG. 3, the CPU 32 receives a Beacon signal including a job ID, a printer ID and a command from the portable device 100 (YES in S5). The command is a command for enabling the CPU 32 to execute the processing of S10 to S40 of FIG. 3. Therefore, the CPU 32 executes the processing of S10 to S40 in accordance with the command received in S5, not the program 36.

Figure 6:
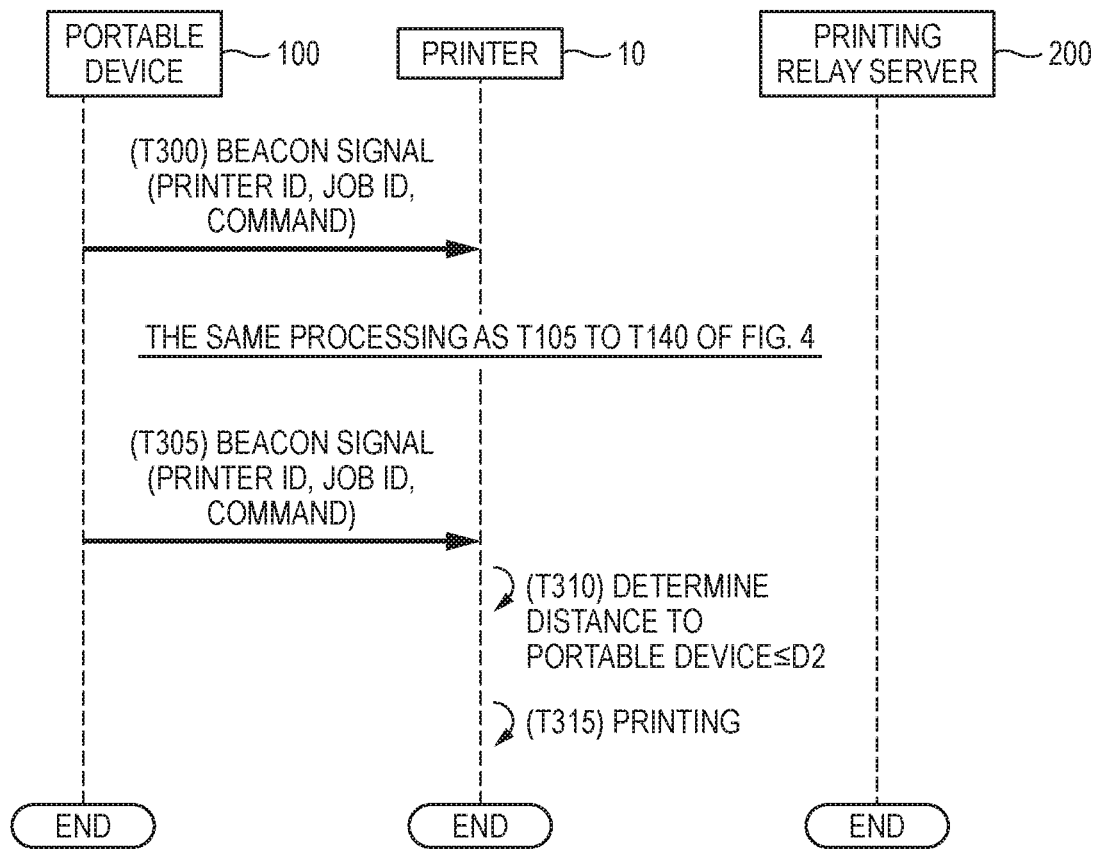
FIG. 6 depicts a sequence diagram of a printing process in the third illustrative embodiment.

(Specific Case; FIG. 6)

Subsequently, a printing process of the third illustrative embodiment is described with reference to FIG. 6. In T300, the printer 10 receives a Beacon signal including a printer ID, a job ID and a command from the portable device 100 (YES in S5 of FIG. 3). The processing of T105 to T140 is the same as the processing of T105 to T140 of FIG. 4, except that the printer 10 executes the processing in accordance with the command received in T300, not the program 36. The processing of T305 is the same as the processing of T300. In T310, the printer 10 determines that a distance between the printer 10 and the portable device 100 is equal to or smaller than the predetermined distance D2 ("distance to the portable device≤D2", in S20). The processing of T315 is the same as the processing of T155 of FIG. 4, except that the printer 10 executes the processing in accordance with the command received in T305, not the program 36.

(Advantages of Third Illustrative Embodiment)

Also in the illustrative embodiment, the printer 10 can rapidly provide with an adequate user with a printed material. Also, in the third illustrative embodiment, the processing of S10 to S40 of FIG. 3 is executed in accordance with the command. Therefore, the program 36 is not required to include the program corresponding to S10 to S40, so that an amount of information to be stored in the memory 34 is reduced. In the third illustrative embodiment, the command received in S5 of FIG. 3 is an example of "the command information".

Fourth Illustrative Embodiment

Differences from the first illustrative embodiment are described. In a fourth illustrative embodiment, the printer 10 executes the processing in accordance with one print mode of a secure mode and a normal mode. The secure mode is a print mode in which the printer 10 is configured to receive a Beacon signal from the portable device 100 and to execute the printing. The normal mode is a print mode in which the printer 10 is configured to execute the printing even though it does not receive a Beacon signal from the portable device 100.

Figure 7:
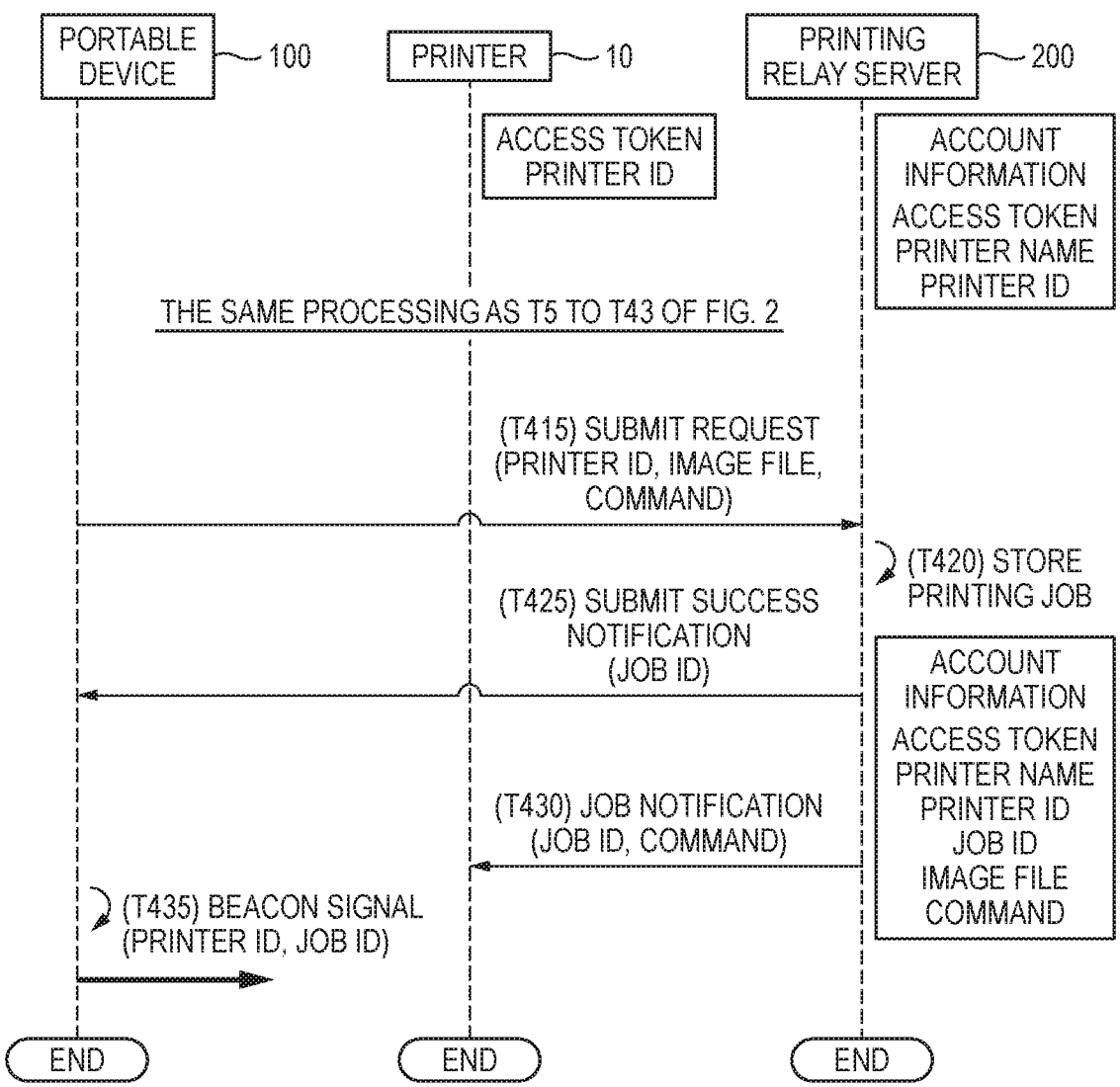
FIG. 7 depicts a sequence diagram of a submit process in a fourth illustrative embodiment.

(Submit Process; FIG. 7)

In the fourth illustrative embodiment, a submit process of FIG. 7 is executed instead of the submit process of FIG. 2. The processing of T5 to T43 of FIG. 7 is the same as the processing of T5 to T43 of FIG. 2. However, in the fourth illustrative embodiment, the submit operation of T43 includes an operation of selecting a print mode to be executed by the printer 10. When the secure mode is selected in T43, the CPU 132 of the portable device 100 transmits a submit request, which includes a printer ID associated with the printer name selected in T42, an image file selected in T43 and a command, to the printing relay server 200 via the Wi-Fi I/F 118. The command is a command that is to be executed by the CPU 32 of the printer 10, and more specifically, a command by which the CPU 32 is to receive a Beacon signal and to execute the printing. The command includes a first distance range, a first execution instruction, a second distance range and a second execution instruction. The first distance range is a range that is equal to or smaller than the predetermined distance D1 and is greater than the predetermined distance D2. The first execution instruction is an instruction for enabling the printer 10 to execute the processing of S130 and S135 of FIG. 8 when a distance between the printer 10 and the portable device 100 is within the first distance range. The second distance range is a range that is equal to or smaller than the predetermined distance D2. The second execution instruction is an instruction for enabling the printer 10 to execute the processing of S140 when a distance between the printer 10 and the portable device 100 is within the second distance range.

When the submit request including the command is received from the portable device 100, the printing relay server 200 stores the command included in the submit request in association with the printer ID and the like, in T420. Then, the printing relay server 200 transmits a submit success notification including a job ID to the portable device 100, in T425. Also, the printing relay server 200 transmits a job notification including the job ID and the command to the printer 10 by using the SMPP connection established in the advance preparation, in T430. The processing of T435 is the same as the processing of T65 of FIG. 2.

In the meantime, although not shown, when the normal mode is selected in T43, the submit request includes a printer ID and an image file but does not a command. In this case, the printing relay server 200 does not store a command in T420, and transmits a job notification, which includes a job ID but does not include a command, to the printer 10, in T430.

Figure 8:
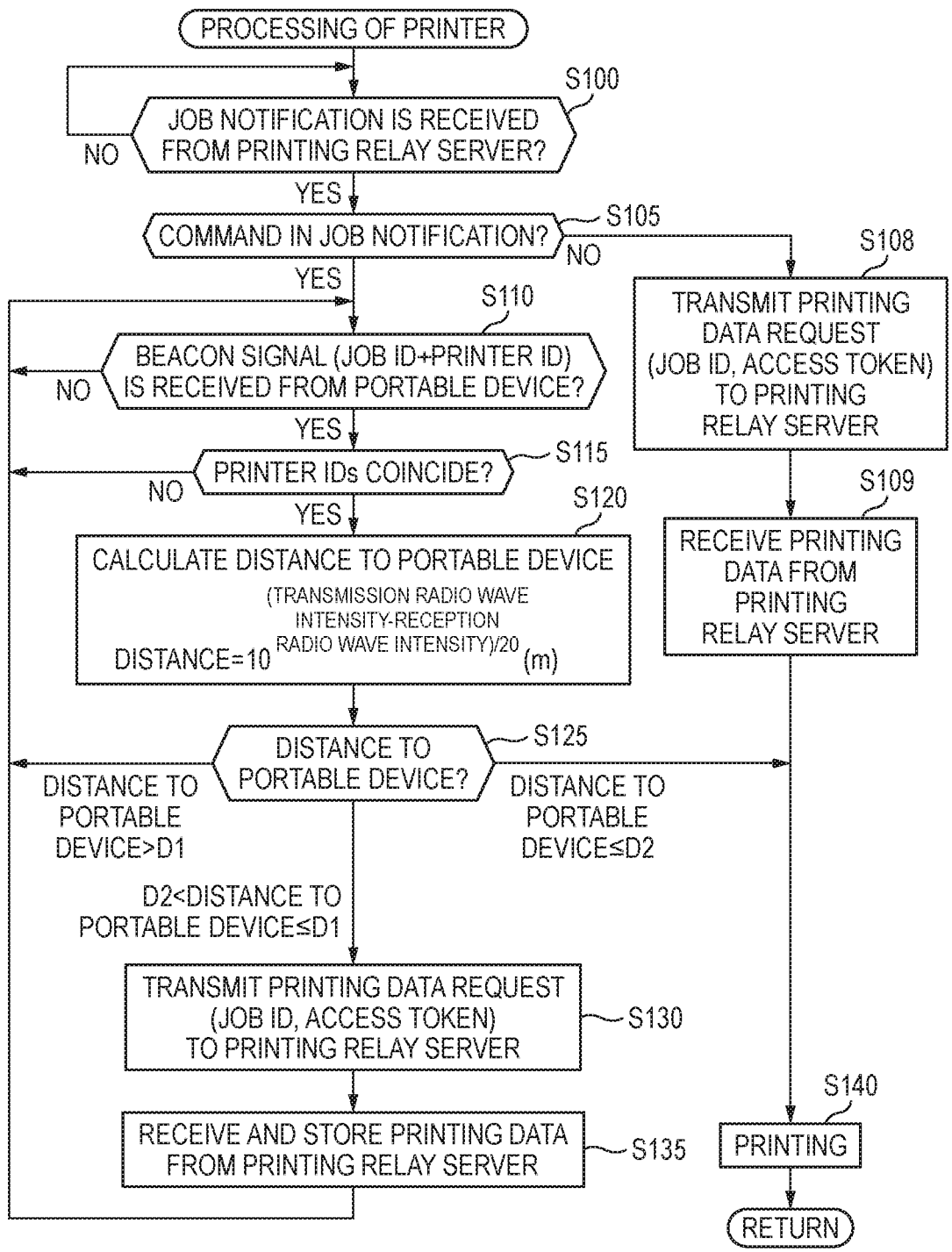
FIG. 8 is a flowchart of processing that is to be executed by a printer in the fourth illustrative embodiment.

(Processing of Printer; FIG. 8)

In the fourth illustrative embodiment, the processing of FIG. 8 is executed, instead of the processing of FIG. 3. In S100, the CPU 32 monitors whether a job notification is received from the printing relay server 200 via the Wi-Fi I/F 18. When the job notification is received from the printing relay server, the CPU 32 determines YES in S100 and proceeds to S105.

In S105, the CPU 32 determines whether the received job notification includes a command. When it is determined that the received job notification includes a command (YES in S105), the CPU 32 proceeds to S110. On the other hand, when it is determined that the received job notification does not include a command (NO in S105), the CPU 32 proceeds to S108.

The processing of S108 is the same as the processing of S30 of FIG. 3 of the first illustrative embodiment. In S109, the CPU 32 receives printing data from the printing relay server 200 via the Wi-Fi I/F 18. The printing data is generated from the image file, which is associated with a job ID in a printing data request to be transmitted in S109, by the printing relay server 200. Then, in S140, the CPU 32 supplies the printing data received in S109 to the printing execution unit 20 and enables the printing execution unit 20 to execute the printing in accordance with the printing data. When the processing of S140 is over, the CPU 32 returns to S100.

On the other hand, when a result of the determination is YES in S105, the CPU 32 executes the processing of S110 to S140 in accordance with the command in the job notification received in S100, not the program 36. The processing of S110 to S140 is the same as the processing of S5 to S40 of FIG. 3 of the first illustrative embodiment.

(Advantages of Fourth Illustrative Embodiment)

Also in the fourth illustrative embodiment, when the secure mode is selected in T43 of FIG. 7, i.e., the job notification of T430 includes the command (YES in S105 of FIG. 8), the printer 10 can rapidly provide an adequate user with a printed material. On the other hand, when the normal mode is selected in T43 of FIG. 7, i.e., the job notification of T430 does not include the command (NO in S105 of FIG. 8), the printer 10 receives the printing data from the printing relay server 200 (S108, S109, in FIG. 8) and executes the printing in accordance with the printing data (S140), even though the printer does not receive the Beacon signal from the portable device 100. Therefore, the printer 10 can rapidly execute the printing immediately after it receives the job notification from the printing relay server 200, irrespective of the distance between the printer 10 and the portable device 100. According to the fourth illustrative embodiment, the printer 10 can execute the printing corresponding to the mode selected by the user. In the fourth illustrative embodiment, the secure mode and the normal mode are examples of "the first operation mode" and "the second operation mode", respectively. The job notification including the command and the job notification not including the command are examples of "the first mode information" and "the second mode information", respectively.

Fifth Illustrative Embodiment

Differences from the first illustrative embodiment are described. In a fifth illustrative embodiment, the printer 10, not the portable device 100, transmits the Beacon signal.

Figure 9:
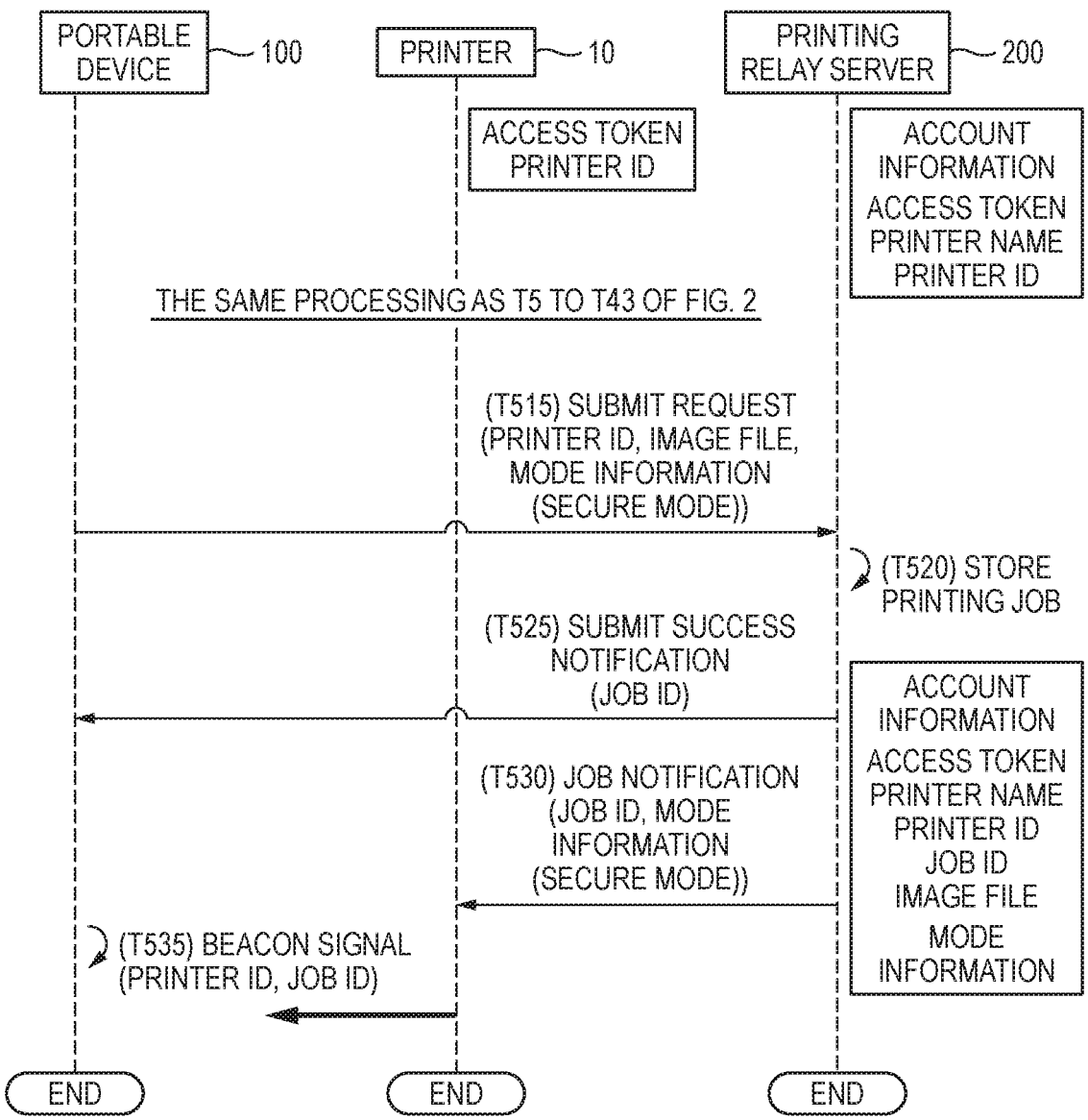
FIG. 9 depicts a sequence diagram of a submit process in fifth and sixth illustrative embodiments.

(Submit Process; FIG. 9)

In the fifth illustrative embodiment, a submit process of FIG. 9 is executed instead of the submit process of FIG. 2. The processing of T5 to T43 is the same as the processing of T5 to T43 of FIG. 2. However, in the fifth illustrative embodiment, the submit operation of T43 includes an operation of selecting a print mode, which is to be executed by the printer 10, from the secure mode and the normal mode. Also, in T42, the CPU 132 of the portable device 100 stores a printer ID associated with the selected printer name in the memory 134. In T515, the CPU 132 transmits a submit request, which includes the printer ID associated with the printer name selected in T42, the image file selected in T43 and the mode information indicative of the print mode selected in T43, to the printing relay server 200 via the Wi-Fi I/F 118. In the example of FIG. 9, the submit request includes the mode information indicative of the secure mode. However, when the normal mode is selected in T43, the submit request includes the mode information indicative of the normal mode.

When the printing relay server 200 receives the submit request from the portable device 100, the printing relay server associates and stores each information (i.e., the printer ID, the image file and the mode information) included in the submit request and the generated job ID, in T520. The processing of T525 is the same as the processing of T60 of FIG. 2. In T530, the printing relay server 200 transmits a job notification including the job ID and the mode information to the printer 10 by using the XMPP connection established in the advance preparation.

When the CPU 32 of the printer 10 receives the job notification from the printing relay server 200 via the Wi-Fi I/F 18, the CPU 32 determines whether the mode information included in the job notification indicates the secure mode or the normal mode. When it is determined that the mode information indicates the secure mode, the CPU 32 repeatedly transmits a Beacon signal including the printer ID and the job ID via the BT I/F 16, in T535. On the other hand, when it is determined that the mode information indicates the normal mode, the CPU 32 does not transmit the Beacon signal. That is, in the fifth illustrative embodiment, the secure mode is a mode for enabling the printer 10 to transmit the Beacon signal, and the normal mode is a mode for enabling the printer 10 not to transmit the Beacon signal.

Figure 10:
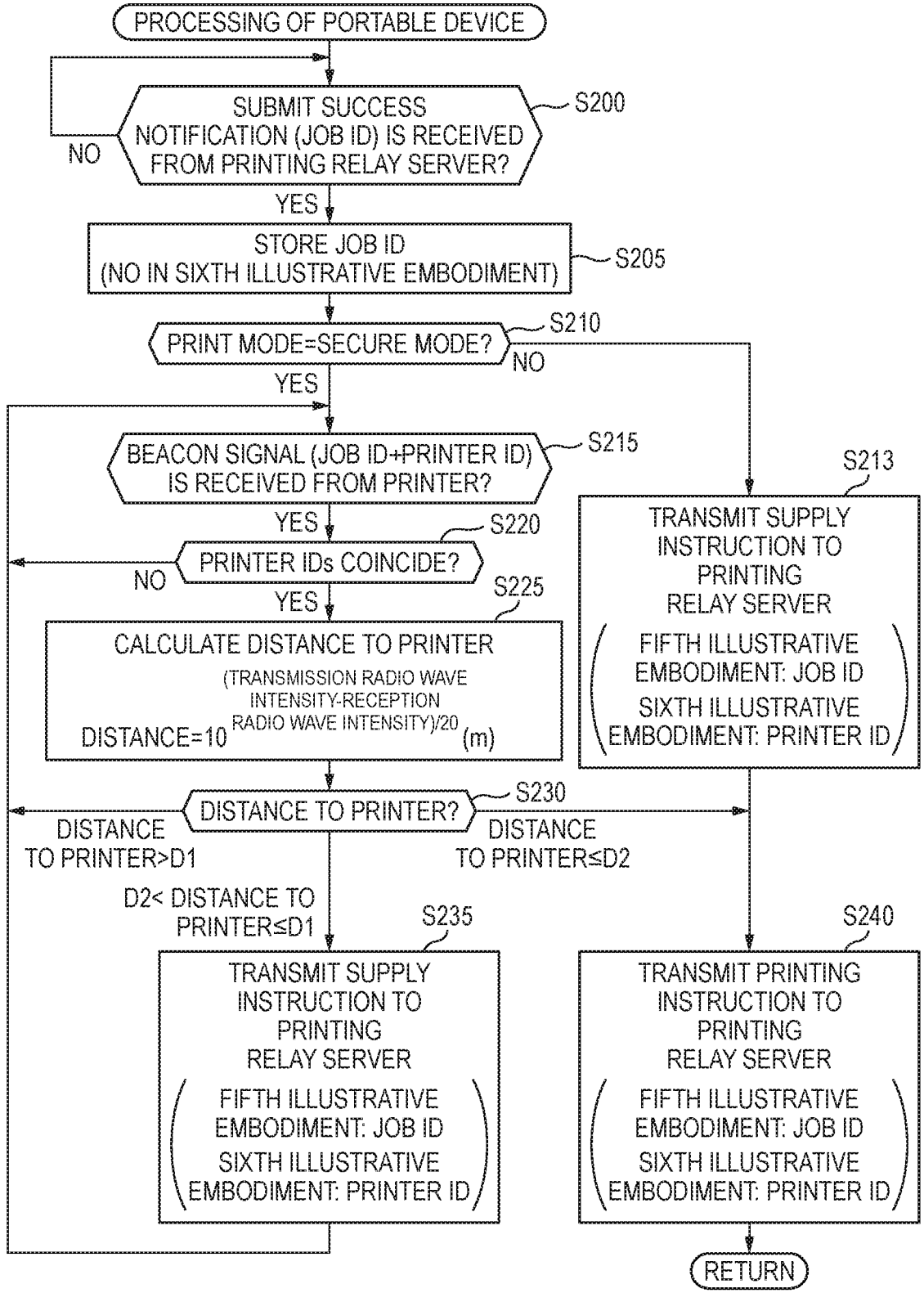
FIG. 10 is a flowchart of processing that is to be executed by a portable device in the fifth and sixth illustrative embodiments.

(Processing of Portable Device; FIG. 10)

Subsequently, processing that is to be executed by the CPU 132 of the portable device 100 in accordance with the application 136 is described with reference to FIG. 10.

In S200, the CPU 132 of the portable device 100 monitors whether a submit success notification (refer to T525 in FIG. 9) including the job ID is received from the printing relay server 200 via the Wi-Fi I/F 118. When the submit success notification is received, the CPU 132 determines YES in S200 and proceeds to S205.

In S205, the CPU 132 stores the job ID in the submit success notification in the memory 134.

In S210, the CPU 132 determines whether the print mode selected in T43 of FIG. 9 is the secure mode. When it is determined that the selected print mode is the secure mode (YES in S210), the CPU 132 proceeds to S215, and when it is determined that the selected print mode is the normal mode (NO in S210), the CPU 132 proceeds to S213.

In S213, the CPU 132 transmits a supply instruction including the job ID to the printing relay server 200 via the Wi-Fi I/F 118. The supply instruction is an instruction for supplying the printing data from the printing relay server 200 to the printer 10. More specifically, the supply instruction is a command for instructing the printing relay server 200 to transmit an obtaining command to the printer 10. The obtaining command is a command for instructing the printer 10 to transmit a printing data request to the printing relay server 200 and to obtain the printing data from the printing relay server 200. Therefore, when the supply instruction is transmitted to the printing relay server 200 in S213, the obtaining command is transmitted from the printing relay server 200 to the printer 10, the printing data request is transmitted from the printer 10 to the printing relay server 200 and the printing data is transmitted from the printing relay server 200 to the printer 10.

In S240 that is executed via S213, the CPU 132 transmits a printing instruction including the job ID to the printing relay server 200 via the Wi-Fi I/F 118. The printing instruction is an instruction for enabling the printer 10 to execute the printing. More specifically, the printing instruction is a command for instructing the printing relay server 200 to transmit a printing command to the printer 10. The printing command is a command for instructing the printer 10 to enable the printing execution unit 20 to execute the printing in accordance with the printing data. Therefore, when the printing instruction is transmitted to the printing relay server 200 in S213, the printing command is transmitted from the printing relay server 200 to the printer 10, so that the printer 10 executes the printing in accordance with the printing data transmitted to the printer 10 from the printing relay server 200 in correspondence to the processing of S213. When the processing of S240 is over, the CPU 132 returns to S200.

In S215, the CPU 132 monitors whether the Beacon signal (refer to T535 in FIG. 9) including the job ID and the printer ID is received from the printer 10 via the BT I/F 116. When the Beacon signal is received from the printer 10, the CPU 132 determines YES in S215 and proceeds to S220.

In S220, the CPU 132 determines whether the printer ID in the received Beacon signal coincides with the printer ID stored in the memory 134 in T42 of FIG. 9. When it is determined that the two printer IDs coincide with each other (YES in S220), the CPU 132 proceeds to S225, and when it is determined that the two printer IDs do not coincide with each other (NO in S220), the CPU 132 returns to S215 without executing the processing of S225 and thereafter.

The processing of S225 and S230 is the same as the processing of S15 and S20 of FIG. 3, except that a processing subject is the portable device 100. When it is determined that the calculated distance is greater than the predetermined distance D1 ("distance to the printer>D1", in S230), the CPU 132 returns to S215. Also, when it is determined that the calculated distance is equal to or smaller than the predetermined distance D1 and is greater than the predetermined distance D2 ("D2<distance to the printer≤D1", in S230), the CPU 132 proceeds to S235. Also, when it is determined that the calculated distance is equal to or smaller than the predetermined distance D2 ("distance to the printer≤D2", in S20), the CPU 132 proceeds to S240.

The processing of S235 is the same as the processing of S213. When the processing of S235 is over, the CPU 132 returns to S215. The processing of S240 that is executed via S230 is the same as the above described processing of S240. Herein, when the printing instruction is transmitted to the printing relay server 200, the printing command is transmitted from the printing relay server 200 to the printer 10, so that the printer 10 executes the printing in accordance with the printing data transmitted to the printer 10 from the printing relay server 200 in correspondence to S235. When the processing of S240 is over, the CPU 132 returns to S200.

(Specific Case; FIG. 11)

Subsequently, a specific case of the printing process that is to be implemented by the processing of FIG. 10 is described with reference to FIG. 11. In the specific case, the secure mode is selected in the submit operation of T43 of FIG. 9 (YES in S210 of FIG. 10).

In T600, the portable device 100 receives the Beacon signal including the printer ID and the job ID from the printer 10 (YES in S215), and determines that the printer ID in the Beacon signal and the stored printer ID coincide with each other (YES in S220). In T605, the portable device 100 calculates a distance between the printer 10 and the portable device 100 (S225), and determines that the calculated distance is equal to or smaller than the predetermined distance D1 and is greater than the predetermined distance D2 ("D2<distance to printer≤D1" in S230). In this case, in T610, the portable device 100 transmits a supply instruction including the job ID to the printing relay server 200 (S235).

When the printing relay server 200 receives the supply instruction including the job ID from the portable device 100, the printing relay server transmits an obtaining command including the job ID to the printer 10 by using the XMPP connection, in T615. When the printer 10 receives the obtaining command from the printing relay server 200, the printer transmits a printing data request, which includes the job ID included in the obtaining command and the access token stored in the advance preparation, to the printing relay server 200, in T620. When the printing relay server 200 receives the printing data request from the printer 10, the printing relay server specifies an image file associated with the job ID in the printing data request and converts the image file into printing data in T625, and transmits the converted printing data to the printer 10, in T630. In T635, the printer 10 stores the received printing data. Thereafter, the user of the portable device 100 further approaches to the printer 10 with carrying the portable device 100.

The processing of T640 is the same as the processing of T600. In T645, the portable device 100 calculates a distance between the printer 10 and the portable device 100 (S225) and determines that the calculated distance is equal to or smaller than the predetermined distance D2 ("distance to portable device≤D2" in S230). In this case, in S650, the portable device 100 transmits a printing instruction including the job ID to the printing relay server 200 (S240).

When the printing relay server 200 receives the printing instruction including the job ID from the portable device 100, the printing relay server transmits a printing command including the job ID to the printer 10 by using the XMPP connection, in T655. When the printer 10 receives the printing command from the printing relay server 200, the printer executes the printing in accordance with the printing data, in T660.

(Advantages of Fifth Illustrative Embodiment)

According to the fifth illustrative embodiment, when the secure mode is selected (YES in S210 of FIG. 10), if it is determined that the distance between the printer 10 and the portable device 100 is equal to or smaller than the predetermined distance D1 and is greater than the predetermined distance D2 (T605 in FIG. 11), the portable device 100 transmits the supply instruction to the printing relay server 200 (T610), thereby supplying the printing data from the printing relay server 200 to the printer 10 (T615 to T630). When it is determined that the distance between the printer 10 and the portable device 100 is equal to or smaller than the predetermined distance D2 (T645), the portable device 100 transmits the printing instruction to the printing relay server 200 (T650), thereby enabling the printer 10 to execute the printing (T655, T660). Thereby, the portable device 100 can rapidly provide an adequate user with a printed material. On the other hand, when the normal mode is selected (NO in S210 of FIG. 10), the portable device 100 can enable the printer 10 to rapidly execute the printing, irrespective of the distance between the printer 10 and the portable device 100 (S213, S240). According to the fifth illustrative embodiment, the portable device 100 can enable the printer 10 to execute the printing corresponding to the mode selected by the user.

Incidentally, the portable device 100 and the printer 10 are examples of "the first communication apparatus" and "the second communication apparatus", respectively. The secure mode and the normal mode are examples of "the first operation mode" and "the second operation mode", respectively. The job ID is an example of "the data information". The BT I/F 116 and the Wi-Fi I/F 118 are examples of "the first interface" and "the second interface", respectively.

Sixth Illustrative Embodiment

Differences from the fifth illustrative embodiment are described. In a sixth illustrative embodiment, the supply instruction and the printing instruction include the printer ID, instead of the job ID, in S213, S235 and S240 of FIG. 10.

(Specific Case; FIG. 10)

Subsequently, a printing process of the sixth illustrative embodiment is described with reference to FIG. 12.

The processing of T600 and T605 is the same as the processing of T600 and T605 of FIG. 11. In T700, the portable device 100 transmits a supply instruction including the printer ID to the printing relay server 200 (S235 in FIG. 10). When the printing relay server 200 receives the supply instruction from the portable device 100, the printing relay server transmits an obtaining command including the printer ID to the printer 10, in T705. When the printer 10 receives the obtaining command from the printing relay server 200, the printer transmits a printing data request including the printer ID and access token to the printing relay server 200, in T710. The processing of T625 to T645 is the same as the processing of T625 to T645 of FIG. 11. However, in T625, the printing relay server 200 specifies an image file associated with the printer ID in the printing data request and converts the image file to generate printing data.

In T715, the portable device 100 transmits a printing instruction including the printer ID to the printing relay server 200 (S240). When the printing relay server 200 receives the printing instruction from the portable device 100, the printing relay server transmits a printing command including the printer ID to the printer 10, in T720. When the printer 10 receives the printing command from the printing relay server 200, the printer executes the printing in accordance with the stored printing data, in T725. Also in the sixth illustrative embodiment, the same effects as the fifth illustrative embodiment are accomplished.

Although the specific examples of the disclosure have been described in detail, they are just exemplary and are not construed to limit the claims. The technology described in the claims includes a variety of changes and modifications to the above specific examples. Modified embodiments of the above illustrative embodiments are described in the below.

MODIFICATIONS TO ILLUSTRATIVE EMBODIMENTS

Modified Embodiment 1

In the first to fourth illustrative embodiments, when the vendor of the portable device 100 provides a plurality of types of portable devices, the respective portable devices may be adjusted so that the transmission radio wave intensities of the Beacon signals of the respective portable devices are the same. In this case, the CPU 32 of the printer 10 may be configured to store the reception radio wave intensity corresponding to the predetermined distance D1 and the reception radio wave intensity corresponding to the predetermined distance D2 in the memory 34 in advance, and to compare the distance to the portable device 100 and the two predetermined distances D1, D2 by comparing the reception radio wave intensity of the Beacon signal and the two reception radio wave intensities in the memory 34, instead of S15 and S20 of FIG. 3 and S120 and S125 of FIG. 8. Likewise, in the fifth and sixth illustrative embodiments, when the vendor of the printer 10 provides a plurality of types of printers, the respective printers may be adjusted so that the transmission radio wave intensities of the Beacon signals of the respective printers are the same. In this case, the CPU 132 of the portable device 100 may be configured to store the reception radio wave intensity corresponding to the predetermined distance D1 and the reception radio wave intensity corresponding to the predetermined distance D2 in the memory 134 in advance, and to compare the distance to the printer 10 and the two predetermined distances D1, D2 by comparing the reception radio wave intensity of the Beacon signal and the two reception radio wave intensities in the memory 134, instead of S225 and S230 of FIG. 10. That is, "the first calculation unit" and "the second calculation unit" may be omitted.

Modified Embodiment 2

The CPU 32 of the printer 10 may be configured to calculate a difference between the transmission radio wave intensity and the reception radio wave intensity, for example, instead of the distance between the printer 10 and the portable device 100, in S15 of FIG. 3 and S120 of FIG. 8. The CPU 32 may be configured to determine whether the calculated difference is equal to or smaller than a predetermined difference, in S20 of FIG. 3 and S125 of FIG. 8. That is, "the first target value" and "the second target value" may be a difference between the transmission radio wave intensity and the reception radio wave intensity, for example.

Modified Embodiment 3

In the respective illustrative embodiments, an IP address allotted to the printer may be used, for example, instead of the printer ID. Generally speaking, "the printer information" may be information for identifying the printer.

Modified Embodiment 4

In the first to fourth illustrative embodiments, the CPU 32 of the printer 10 may be configured to execute following processing, instead of S30 of FIG. 3 and S130 of FIG. 8. That is, the CPU 32 transmits a job ID request including the printer ID and access token to the printing relay server 200 via the Wi-Fi I/F 18, and receives a job ID associated with the printer ID in the job ID request from the printing relay server 200 via the Wi-Fi I/F 18. In the meantime, when the printer ID is associated with a plurality of job IDs, the plurality of job IDs is received. The CPU 32 specifies a job ID, which coincides with the job ID included in the Beacon signal received in S5 of FIG. 3 or S110 of FIG. 8, from the received job ID, transmits a URL (abbreviation of Uniform Resource Locator) including the specified job ID to the printing relay server 200 via the Wi-Fi I/F 18, and receives a URL, which is generated by the printing relay server 200, from the printing relay server 200 via the Wi-Fi I/F 18. The URL is information indicative of a position of an image file in the printing relay server 200. The CPU 32 transmits a printing data request including the URL to the printing relay server 200 via the Wi-Fi I/F 18. In S35 of FIG. 3 and S135 of FIG. 8, the CPU 32 receives printing data, which is generated from an image file specified by the URL in the printing data request, from the printing relay server 200 via the Wi-Fi I/F 18. In this case, the URL is an example of "the data information".

Modified Embodiment 5

The printing relay server 200 may not be provided. In this case, for example, when an image file stored in an external server is selected as a printing target by the user in T43 of FIG. 2, the portable device 100 may transmit a Beacon signal, which includes authentication information (for example, an access token) for accessing the external server and a URL indicative of a position of the image file in the external server, in T65. In this case, the processing of T30 to T60 is not executed. When a result of the determination is YES in S5 of FIG. 3, the CPU 32 of the printer 10 executes the processing of S15 and S20 without executing the processing of S10. When it is determined in S20 that the distance to the portable device 100 is equal to or smaller than the predetermined distance D1 and is greater than the predetermined distance D2, the CPU 32 obtains an image file from the external server by using the authentication information and URL without executing the processing of S25. Also, when it is determined S20 that the distance to the portable device 100 is equal to or smaller than the predetermined distance D2, the CPU 32 enables the printing execution unit 20 to execute the printing in accordance with the obtained image file, in S40. In Modified Embodiment 5, the external server is an example of "the server".

Modified Embodiment 6

In the fifth and sixth illustrative embodiments, when the printing relay server 200 receives the supply instruction from the portable device 100 (T610 of FIG. 11, T700 of FIG. 12), the printing relay server may transmit the printing data to the printer 10 without transmitting the obtaining command (T630 of FIG. 11, T710 of FIG. 12). That is, "the supply instruction" may not be a command for instructing the server to transmit the obtaining command to the printer, which is the second communication apparatus.

Modified Embodiment 7

The respective devices 10, 100 may have an I/F for performing wireless communication in accordance with a communication method (for example, WFD (abbreviation of Wi-Fi Direct)) different from the Wi-Fi method, instead of the Wi-Fi I/F. That is, "the second communication interface" is not limited to the Wi-Fi I/F 18, 118 and may be an I/F for performing wireless communication in accordance with the other communication methods.

Modified Embodiment 8

The respective devices 10, 100 may not have the BT I/F. In this case, for example, the CPU 32 receives the Beacon signal, which is transmitted in accordance with the Wi-Fi method, via the Wi-Fi I/F 18, instead of the Beacon signal, which is transmitted in accordance with the BT method, in S5 of FIG. 3 and S110 of FIG. 8. Likewise, for example, the CPU 132 receives the Beacon signal, which is transmitted in accordance with the Wi-Fi method, via the Wi-Fi I/F 118, instead of the Beacon signal, which is transmitted in accordance with the BT method, in S215 of FIG. 10. That is, "the first communication interface" may be omitted.

Modified Embodiment 9

The "printer" is not limited to the printer 10, and may be a multifunctional device having a printing function and other functions (for example, a scan function, a FAX function and the like).

Modified Embodiment 10

In the respective illustrative embodiments, the respective processing of FIGS. 2 to 10 is implemented as the CPU 32 of the printer 10 and the CPU 132 of the portable device 100 execute the program (i.e., the software). Instead of this configuration, at least one of the respective processing of FIGS. 2 to 10 may be implemented by hardware such as a logical circuit and the like.

Modified Embodiment 11

The values of the predetermined distances D1 and D2 can be set arbitrary so long as the value of the predetermined distance D2 is smaller than the value of the predetermined distance D1. For example, the value of the predetermined distance D1 may be set greater than 3 m and equal to or smaller than 10 m, and the value of the predetermined distance D2 may be set equal to or smaller than 3 m. It may be configured to allow the user to set the value of the predetermined distance D2 arbitrary in a range of, for example, equal to or greater than 10 cm and equal to or smaller than 5 m. It may also be configured to allow the user to set the value of the predetermined distance D1 arbitrary in a range of, for example, equal to greater than 5 m and equal to or smaller than 10 m. For example, the value of the predetermined distance D2 may be set to 2 m, and the value of the predetermined distance D1 may be set to 8 m.

Also, the technical elements described in the specification or drawings exhibit the technical usefulness individually or by a variety of combinations and are not limited to combinations defined in the claims at the time of the filing of the subject application. Also, the technologies described in the specification or drawings accomplish a plurality of purposes at the same time, and one accomplishment of the purposes also has the technical usefulness.

What is claimed is:

1. A non-transitory computer-readable medium having a computer program stored thereon and readable by a computer of a terminal device comprising a first interface, the computer program, when executed by the computer, causes the terminal device to perform operations comprising:
    receiving a specific signal from a printer comprising a printing execution unit via the first interface, the specific signal including identification information;
    determining whether an inter-device distance between the terminal device and the printer is equal to or smaller than a first predetermined distance by using a first reception radio wave intensity of the received specific signal;
    performing a first process by using the identification information included in the specific signal received from the printer when it is determined that the inter-device distance is equal to or smaller than the first predetermined distance, such that printing data is supplied from a server to the printer;
    again receiving the specific signal from the printer via the first interface after performing the first process;
    determining whether the inter-device distance is equal to or smaller than a second predetermined distance by using a second reception radio wave intensity of the again-received specific signal, the second predetermined distance being smaller than the first predetermined distance; and
    performing a second process by using the identification information included in the again-received specific signal received from the printer when it is determined that the inter-device distance is equal to or smaller than the second predetermined distance such that the printing execution unit of the printer executes printing in accordance with the printing data, which has been obtained from the server by the printer.

2. The non-transitory computer-readable medium according to claim 1,
    wherein the identification information is printer identification information for identifying the printer, and
    wherein in the first process, the printing data is supplied from the server to the printer that is identified by the printer identification information.

3. The non-transitory computer-readable medium according to claim 1,
    wherein the identification information is data identification information for identifying target data, and
    wherein the printing data supplied by the first process is based on the target data identified by the data identification information.

4. The non-transitory computer-readable medium according to claim 1, wherein the first process comprises transmitting information to the server, the information including the identification information and being for causing the server to supply the printing data to the printer.

5. The non-transitory computer-readable medium according to claim 4,
    wherein the information is a command for instructing the server to transmit an obtaining command to the printer, and
    wherein the obtaining command is a command for instructing the printer to obtain the printing data from the server.

6. The non-transitory computer-readable medium according to claim 4, wherein the first process comprises transmitting the information to the server via a second interface of the terminal device.

7. The non-transitory computer-readable medium according to claim 1, wherein the second process comprises transmitting information to the server, the information including the identification information and being for causing the printing execution unit of the printer to execute printing in accordance with the printing data.

8. The non-transitory computer-readable medium according to claim 7,
    wherein the information is a command for instructing the server to transmit a printing command to the printer, and
    wherein the printing command is a command for instructing the printer to cause the printing execution unit to execute the printing in accordance with the printing data.

9. The non-transitory computer-readable medium according to claim 7, wherein the second process comprises transmitting the information to the server via a second interface of the terminal device.

10. The non-transitory computer-readable medium according to claim 1, wherein the operations further comprise:
    transmitting, to the server, mode information indicative of an operation mode for executing the printing in accordance with the printing data, the mode information being one of a plurality of mode information comprising first mode information indicative of a first operation mode and second mode information indicative of a second operation mode that is different from the first operation mode,
    wherein the first operation mode is a mode for causing the printer to transmit the specific signal, and wherein the second operation mode is a mode for causing the server to supply the printing data to the printer, without causing the printer to transmit the specific signal.

11. The non-transitory computer-readable medium according to claim 1, wherein the first interface is configured to perform wireless communication in accordance with Bluetooth Low Energy method.

12. A terminal device comprising:
an interface; and
a control device configured to:
    receive a specific signal from a printer comprising a printing execution unit via the interface, the specific signal including identification information;
    determine whether an inter-device distance between the terminal device and the printer is equal to or smaller than a first predetermined distance by using a first reception radio wave intensity of the received specific signal;
    perform a first process by using the identification information included in the specific signal received from the printer when it is determined that the inter-device distance is equal to or smaller than the first predetermined distance, such that printing data is supplied from a server to the printer;
    again receive the specific signal from the printer via the interface after performing the first process;
    determine whether the inter-device distance is equal to or smaller than a second predetermined distance by using a second reception radio wave intensity of the again-received specific signal, the second predetermined distance being smaller than the first predetermined distance; and
    perform a second process by using the identification information included in the again-received specific signal received from the printer when it is determined that the inter-device distance is equal to or smaller than the second predetermined distance such that the printing execution unit of the printer executes printing in accordance with the printing data, which has been obtained from the server by the printer.

13. The terminal device according to claim 12, wherein the first process comprises transmitting information to the server, the information including the identification information and being for causing the server to supply the printing data to the printer.

14. The terminal device according to claim 12, wherein the second process comprises transmitting information to the server, the information including the identification information and being for causing the printing execution unit of the printer to execute printing in accordance with the printing data.

15. A method for a terminal device comprising an interface, the method comprising:
    receiving a specific signal from a printer comprising a printing execution unit via the interface, the specific signal including identification information;
    determining whether an inter-device distance between the terminal device and the printer is equal to or smaller than a first predetermined distance by using a first reception radio wave intensity of the received specific signal;
    performing a first process by using the identification information included in the specific signal received from the printer when it is determined that the inter-device distance is equal to or smaller than the first predetermined distance, such that printing data is supplied from a server to the printer;
    again receiving the specific signal from the printer via the interface after performing the first process;
    determining whether the inter-device distance is equal to or smaller than a second predetermined distance by using a second reception radio wave intensity of the again-received specific signal, the second predetermined distance being smaller than the first predetermined distance; and
    performing a second process by using the identification information included in the specific signal received from the printer when it is determined that the inter-device distance is equal to or smaller than the second predetermined distance such that the printing execution unit of the printer executes printing in accordance with the printing data, which has been obtained from the server by the printer.

16. The method according to claim 15, wherein the first process comprises transmitting information to the server, the information including the identification information and being for causing the server to supply the printing data to the printer.

17. The method according to claim 15, wherein the second process comprises transmitting information to the server, the information including the identification information and being for causing the printing execution unit of the printer to execute printing in accordance with the printing data.

* * * * *